(12) United States Patent
Miller et al.

(10) Patent No.: US 10,064,400 B2
(45) Date of Patent: Sep. 4, 2018

(54) FISHING ROD WITH GRAPHENE AND METHOD OF MANUFACTURING

(71) Applicant: G-Rods International, Plano, TX (US)

(72) Inventors: Vanhdy Miller, Sachse, TX (US); Glenn Miller, Sachse, TX (US); Chi Kai Tseng, Taipei (TW)

(73) Assignee: G-Rods International LLC, Plano, TX (US)

( * ) Notice: Subject to any disclaimer, the term of this patent is extended or adjusted under 35 U.S.C. 154(b) by 408 days.

(21) Appl. No.: 14/728,022

(22) Filed: Jun. 2, 2015

(65) Prior Publication Data

US 2016/0353723 A1  Dec. 8, 2016

(51) Int. Cl.

| | | |
|---|---|---|
| *A01K 87/00* | (2006.01) | |
| *B29C 70/02* | (2006.01) | |
| *B29C 70/32* | (2006.01) | |
| *B29C 70/08* | (2006.01) | |
| *B29L 31/00* | (2006.01) | |
| *B29L 23/00* | (2006.01) | |
| *B29K 63/00* | (2006.01) | |
| *B29K 105/16* | (2006.01) | |
| *B29K 507/04* | (2006.01) | |

(52) U.S. Cl.
CPC ............ *A01K 87/00* (2013.01); *B29C 70/025* (2013.01); *B29C 70/081* (2013.01); *B29C 70/32* (2013.01); *B29K 2063/00* (2013.01); *B29K 2105/16* (2013.01); *B29K 2507/04* (2013.01); *B29K 2713/00* (2013.01); *B29L 2023/22* (2013.01); *B29L 2031/7002* (2013.01)

(58) Field of Classification Search
CPC .... A01K 87/00; B29C 70/025; B29C 70/081; B29C 70/32
See application file for complete search history.

(56) References Cited

U.S. PATENT DOCUMENTS

| | | |
|---|---|---|
| 3,385,569 A | 5/1968 | Bookout |
| 4,043,074 A | 8/1977 | Airhart |
| | (Continued) | |

FOREIGN PATENT DOCUMENTS

| | | |
|---|---|---|
| CN | 103552325 A | 2/2014 |
| JP | 2013256099 A | 12/2013 |
| | (Continued) | |

OTHER PUBLICATIONS

"Fusion Fishing Rods," Fusion Fishing Rods Outdoor Gear/Sporting Goods, https://www.facebook.com/Fusion-Fishing-Rods-194703340684812/?fref=ts, downloaded Dec. 10, 2015, 3 pages.

(Continued)

*Primary Examiner* — Christopher P Ellis
(74) *Attorney, Agent, or Firm* — Wei Wei Jeang; Grable Martin Fulton PLLC

(57) ABSTRACT

A fishing rod comprises a hollow tubular rod blank having a plurality of prepreg layers, where each prepreg layer includes a graphene-resin mixture comprising a resin and a graphene preparation evenly disposed throughout the resin. The rod blank further includes a fiber cloth impregnated with the graphene-resin mixture. The plurality of prepreg layers are applied and pressed together in alternate layers of graphene-resin mixture and fiber cloth to form the rod blank.

22 Claims, 3 Drawing Sheets

(56) References Cited

U.S. PATENT DOCUMENTS

| | | | |
|---|---|---|---|
| 4,132,579 A | | 1/1979 | VanAuken |
| 4,178,713 A | | 12/1979 | Higuchi |
| 4,987,175 A | | 1/1991 | Bunnell, Sr. |
| 5,645,925 A | * | 7/1997 | Sheppard ............... C08G 69/04 |
| | | | 252/182.17 |
| 5,897,447 A | | 4/1999 | Nishihara |
| 6,071,460 A | | 6/2000 | Renaudin et al. |
| 6,709,347 B1 | | 3/2004 | Ono et al. |
| 6,986,876 B2 | | 1/2006 | Smalley et al. |
| 7,151,129 B2 | | 12/2006 | Ishikawa et al. |
| 8,342,989 B2 | | 1/2013 | Lammer |
| 8,647,548 B1 | * | 2/2014 | Humfeld ..................... C08J 3/20 |
| | | | 264/137 |
| 8,894,517 B2 | | 11/2014 | Lammer |
| 9,421,739 B2 | * | 8/2016 | Humfeld ................. C08K 9/04 |
| 9,434,826 B2 | * | 9/2016 | Humfeld ................. C08J 5/06 |
| 2006/0251877 A1 | * | 11/2006 | Pirazzini ................ A01K 87/00 |
| | | | 428/292.1 |
| 2010/0125013 A1 | * | 5/2010 | Lammer ................ A63B 49/10 |
| | | | 473/547 |
| 2010/0219383 A1 | | 9/2010 | Eklund |
| 2011/0220235 A1 | * | 9/2011 | Cameron .............. B29C 70/025 |
| | | | 138/109 |
| 2012/0251925 A1 | | 10/2012 | Sasaki |
| 2012/0298396 A1 | * | 11/2012 | Hong ..................... D01F 9/127 |
| | | | 174/107 |
| 2013/0309926 A1 | * | 11/2013 | Tarumoto ............... B82Y 30/00 |
| | | | 442/111 |
| 2014/0113086 A1 | | 4/2014 | Greenhill et al. |
| 2014/0121350 A1 | * | 5/2014 | You ..................... C08G 73/105 |
| | | | 528/422 |
| 2016/0002390 A1 | * | 1/2016 | Hughes ..................... C08J 5/24 |
| | | | 523/427 |
| 2016/0193751 A1 | * | 7/2016 | Humfeld .................. C08J 5/042 |
| | | | 428/323 |
| 2016/0194460 A1 | * | 7/2016 | Humfeld .................. C08J 5/042 |
| | | | 428/408 |

FOREIGN PATENT DOCUMENTS

| | | |
|---|---|---|
| WO | 2014102603 A1 | 7/2014 |
| WO | 2014107725 A1 | 7/2014 |
| WO | 2015042036 A1 | 3/2015 |

OTHER PUBLICATIONS

"The Race to a Graphene Spey Rod?," Spey Clave Casting Forums, http://www.speypages.com/speyclave/59-rods/43087-race-graphene-spey-rod.html, Oct. 18, 2010, 7 pages.

Smith, Ethan, "Graphene: The next Fly Rod material, perhaps?," The Fiddle and Creel, https://fiddleandcreel.wordpress.com/2011/04/21/graphene-the-next-fly-rod-material-perhaps, Apr. 21, 2011, 3 pages.

"Graphene sci fi rods," Sealine—South African Angling and Boating Community, http://www.sealine.co.za/view_topic.php?id=88933&forum_id=1, posted Dec. 13, 2013, 3 pages.

International Search Report and Written Opinion received in Patent Cooperation Treaty Application No. PCT/US16/035551, dated Oct. 7, 2016, 11 pages.

International Search Report and Written Opinion received in Patent Cooperation Treaty Application No. PCT/US16/041409, dated Oct. 11, 2016, 11 pages.

Shen, Ming-Yuan, et al., "Mechanical Properties and Tensile Fatigue of Graphene Nanoplatelets Reinforced Polymer Nanocomposites," Journal of Nanomaterials, vol. 2013, May 31, 2013, 10 pages.

\* cited by examiner

FISHING ROD WITH GRAPHENE AND METHOD OF MANUFACTURING

FIELD

The present disclosure relates to the field of fishing equipment, and more particularly to a fishing rod with graphene and method of manufacturing.

BACKGROUND

Fishing rod technology has evolved from the bamboo poles of yester years to today's fishing rods reinforced with graphite, fiberglass, and resin. Anglers desire fishing rods that are light-weight, durable, sensitive, and powerful. They want rods that are easy to handle and carry, have the right amount of stiffness or flexibility to enable casting and placing the lure in the water where the fish are located, and have sufficient strength and integrity to lift the catch out of the water. The term "action" is used to describe how much of the rod deflects or bends when pressure is put on its tip. In general, a fast action rod bends less than one that is a slow or moderate action rod of the same type. For example, most bass rod actions are fast to very fast to provide better sensitivity and faster power for setting the hook. The type of lure that will be used also should be considered when selecting a fishing rod. "Power" is a term used to describe the strength or lifting ability of the rod. The power of the rod is described using heavy, medium heavy, medium, etc. In general, the power of the rod should be compatible with the weight of the fishing line that will be used. Another term used to describe fishing rods is "responsiveness." This term is used to describe the ability of the entire rod to flex under load and then return to the original state when the load is released. In general, the lighter the rod, the more responsive it is to load conditions. Much experimentation and research have been devoted to constructing the perfect rod.

DETAILED DESCRIPTION

Figure 1:
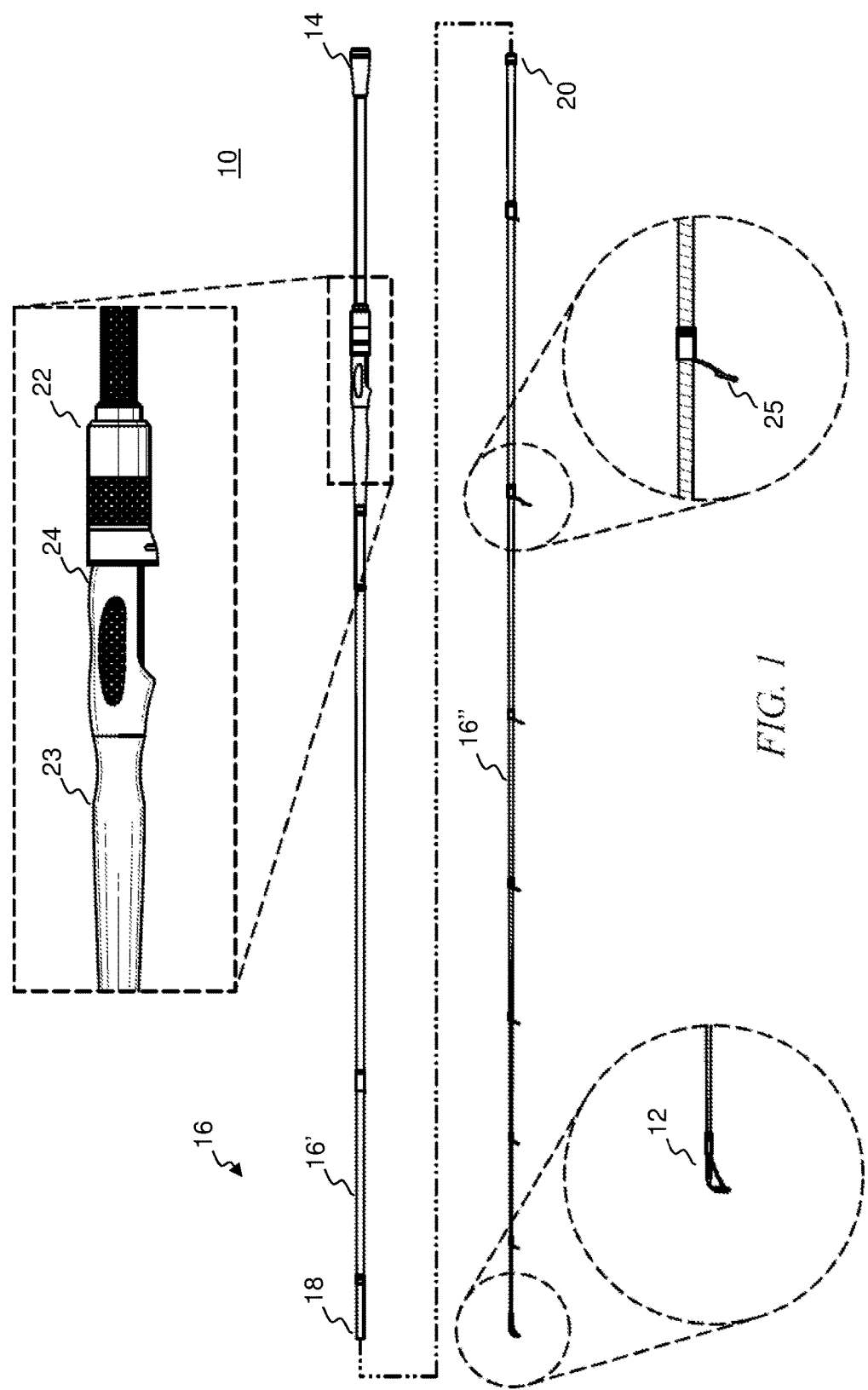
FIG. 1 is a perspective view of an exemplary embodiment of a fishing rod with graphene according to the present disclosure.

FIG. 1 is a perspective view of an exemplary embodiment of a fishing rod 10 with graphene according to the present disclosure. The fishing rod 10 includes a rod tip 12 at the distal end, a rod butt 14 at the proximal end, and a hollow rod blank 16 that is preferably constructed in one or more sections 16' and 16" to facilitate storage and transport. The embodiment shown in FIG. 1 comprises two rod blank sections 16' and 16" that may be joined together. The two sections may be joined by a ferrule joint, in which the end 18 of one section 16' can be inserted into the ferrule aperture 20 of the other section 16". Other suitable methods of joining the rod blank sections may be incorporated. The rod blank sections are preferably tapered, tubular, and hollow. However, rod blanks of other cross-section shapes (e.g., triangle, square, hexagon, octagon, etc.) that are hollow or filled with lightweight materials are also contemplated.

The fishing rod 10 further includes a grip or handle 22 located at or near the proximal end of the rod, and another portion of the handle 23 disposed proximate to a reel seat 24 for securing a fishing reel (not explicitly shown). The rod further includes a plurality of fishing line guides 25 disposed along a longitudinal axis of the rod. The fishing rod blank sections are formed and manufactured by a novel manufacturing process using a layered construction of fiber cloth and a resin with graphene incorporated therein.

Figure 2:
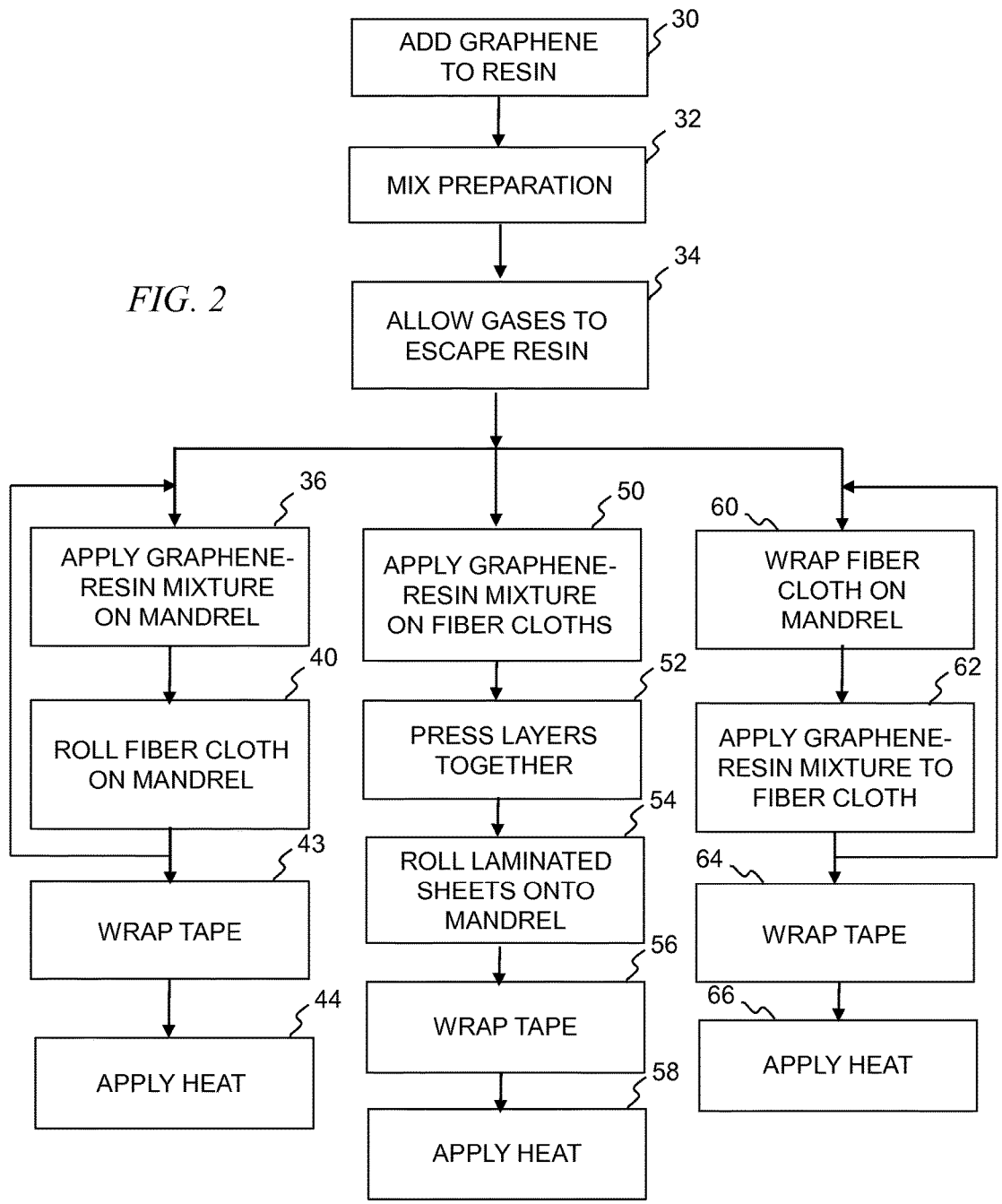
FIG. 2 is a simplified flowchart of exemplary manufacturing processes for making a fishing rod blank with graphene according to the present disclosure.
Figure 3:
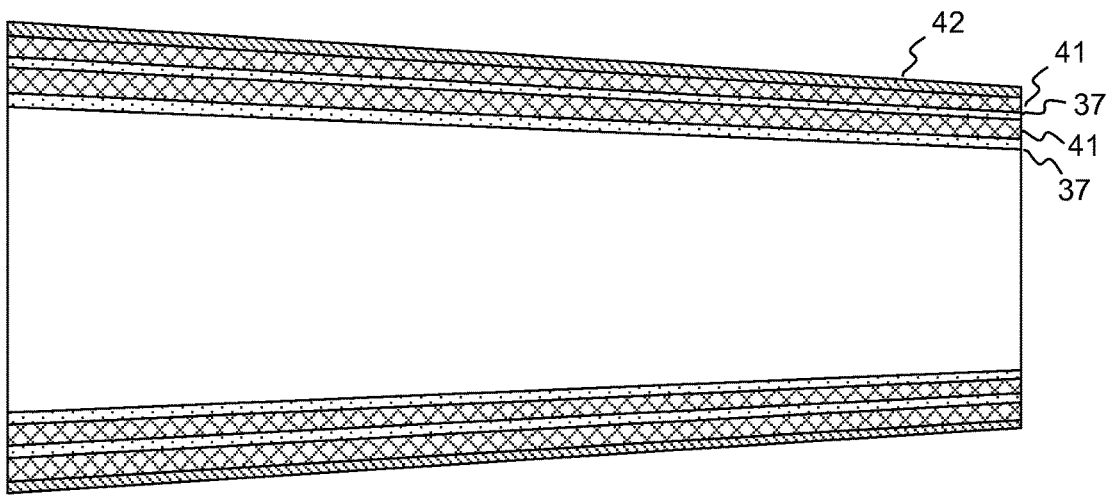
FIG. 3 is a cross-sectional view of an exemplary embodiment of a fishing rod blank with graphene according to the present disclosure.
Figure 4:
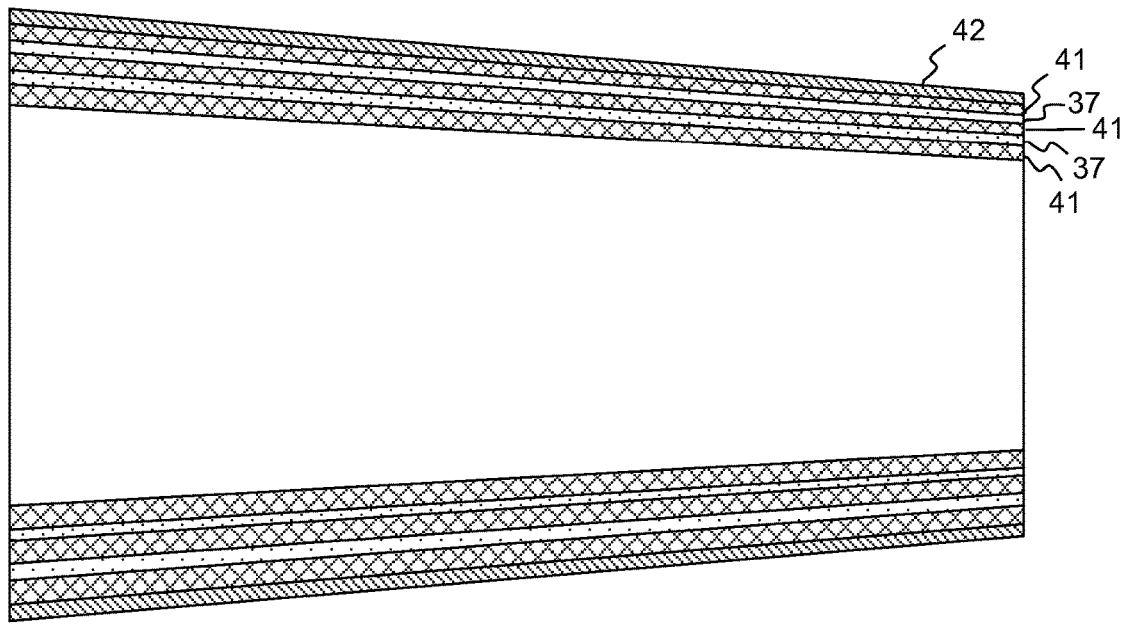
FIG. 4 is a cross-sectional view of another exemplary embodiment of a fishing rod blank with graphene according to the present disclosure.

FIG. 2 is a simplified flowchart of exemplary manufacturing processes for making a fishing rod blank incorporating graphene according to the present disclosure, and references will be made to FIGS. 3 and 4 showing cross-sectional views of exemplary embodiments of a fishing rod blank with graphene. It should be noted that the drawings are not necessarily to scale and in some instances proportions have been exaggerated in order to more clearly depict certain features of the rod. As shown in block 30 of FIG. 2, graphene is added to a resin. The resin may be a polyester resin, a vinylester resin, an epoxy resin, and/or any other suitable resin now known or to be developed. Graphene is an allotrope of carbon in the form of two-dimensional, atomic-scale, hexagonal lattice in which one atom forms each vertex. Graphene is a single planar sheet of $sp^2$-bonded carbon atoms that are densely packed in a honeycomb crystal lattice. The graphene may be formed into particles, flakes, sheets, or other forms prior to being mixed with the resin. The graphene particles may be nano-particles commonly referred to as graphene nano-powder. Graphene is superior to other materials such as graphite and fiberglass in strength, stiffness, and other properties. The graphene and the resin (in liquid form) are mixed together slowly for approximately ten minutes to evenly distribute the graphene nano-particles within the resin, as shown in block 32. The graphene may constitute about ten percent (10%) of the resultant resin preparation by weight. It should be noted that the percentage can be adjusted upward or downward depending on the desired characteristics of the finished product. The resin mixture is then set aside to allow gases trapped in the resin to rise and escape, as shown in block 34.

In one embodiment of the manufacturing process, the graphene-resin mixture is then applied to a steel mandrel (not shown), as shown in block 36. For example, the graphene-resin mixture can be brushed onto the mandrel so that it evenly coats the mandrel on all sides. The graphene-resin mixture can be applied to the entire length of the mandrel or to only one or more selective sections of the mandrel. As shown in FIG. 3, this application of the graphene-resin mixture forms the most inner layer 37 of the rod blank 38. In block 40, a woven or non-woven fiber cloth 41 constructed of materials including graphene fibers, carbon fibers, graphite fibers, boron fibers, glass fibers, silicon carbide fibers, ceramic fibers, KEVLAR fibers, and/or aramid fibers (or a combination of two or more of these materials), is rolled onto the mandrel over the graphene-resin mixture layer 37 (FIG. 3). For example, 1K carbon fiber cloth (one thousand filaments in one roving or skein), 2K carbon fiber cloth (two thousand filaments in one roving or skein), 3K carbon fiber cloth (three thousand filaments in one roving or skein), X carbon fiber cloth (two-directional weave), or unidirectional carbon fiber cloth (one directional weave) may be used. A special rolling machine may be used to tightly roll the fiber cloth onto the mandrel. These two steps 36 and 40 form a prepreg (preimpregnated) layer that includes the fiber cloth layers impregnated with the graphene-resin mixture. These two steps 36 and 40 are repeated to add multiple layers of graphene-resin layer 37 and fiber cloth 41. The number of prepreg layers used to construct the rod blank is dependent on the type of rod being made, the action, speed, and power of the rod, and other desired characteristics of the rod. An exemplary rod blank may comprise a first graphene-resin layer, a unidirectional carbon fiber cloth layer (with the orientation of the fibers running longitudinally), a second graphene-resin layer, an X carbon fiber cloth layer, a third graphene-resin layer, a unidirectional carbon fiber cloth layer (with the orientation of the fibers running circumferentially), a fourth graphene-resin layer, and a 1K carbon fiber cloth layer. Any of these layers may cover all of the rod blank or only selected portions thereof. For example, the 1K carbon layer may be applied to the proximal end of the rod up to the first line guide. After the desired number of prepreg layers are formed and pressed together, a long continuous tape 42 is tightly wrapped helically around the outermost layer of the rod blank, as shown in block 43. The tape 42 provides waterproof properties and can be made of cellophane and/or other suitable materials. In block 44, heat is applied to cure the resin. For example, the rod blank may be baked at approximately 130 degrees Celsius for approximately 150 minutes. The bake temperature and duration may be determined based on the type of resin used in the process. It should be understood that the application of the tape is optional.

In another exemplary embodiment of the manufacturing process, the graphene-resin mixture 37 is applied directly to individual sheets of fiber cloth 41 to form multiple layers of prepreg, as shown in block 50. As described above, the fiber cloth may be woven or non-woven, and may include graphene fibers, carbon fibers, graphite fibers, boron fibers, glass fibers, silicon carbide fibers, ceramic fibers, KEVLAR fibers, and/or aramid fibers (or a combination of two or more of these materials). Examples of carbon fiber cloth may further include 1K carbon fiber cloth (one thousand filaments in one roving or skein), 2K carbon fiber cloth (two thousand filaments in one roving or skein), 3K carbon fiber cloth (three thousand filaments in one roving or skein), X carbon fiber cloth (two-directional weave), or unidirectional carbon fiber cloth (one directional weave). The graphene-resin mixture may be brushed onto each fiber cloth or the graphene-resin mixture can be applied between each layer of fiber cloth. When the desired number of prepreg (fiber cloth and resin) layers have been applied together, a pressing machine may be used to tightly press and adhere the prepreg layers, as shown in block 52. The number of prepreg layers used to construct the rod blank is dependent on the type of rod being made, the action, speed, and power of the rod, and other desired characteristics of the rod. Any of the prepreg layers may cover all of the rod blank or only selected portions thereof. For example, the 1K carbon layer may be applied to the proximal end of the rod up to the first line guide. The prepreg layers are then rolled onto the mandrel using a rolling machine, as shown in block 54. Thereafter, a long continuous tape 42 is tightly wrapped helically around the outermost layer of the rod blank, as shown in block 56. The tape 42 provides waterproof properties and can be made of cellophane and/or other suitable materials. In block 58, heat is applied to cure the resin. For example, the rod blank may be baked at approximately 130 degrees Celsius for approximately 150 minutes. The bake temperature and duration may be determined based on the type of resin used in the manufacturing process. The application of the tape is optional.

In a third exemplary embodiment of the manufacturing process, a sheet of fiber cloth, such as carbon cloth, is wrapped on the mandrel, as shown in block 60. As described above, the fiber cloth may be woven or non-woven, and may include graphene fibers, carbon fibers, graphite fibers, boron fibers, glass fibers, silicon carbide fibers, ceramic fibers, KEVLAR fibers, and/or aramid fibers (or a combination of two or more of these materials). Examples of carbon fiber cloth may further include 1K carbon fiber cloth (one thousand filaments in one roving or skein), 2K carbon fiber cloth (two thousand filaments in one roving or skein), 3K carbon fiber cloth (three thousand filaments in one roving or skein), X carbon fiber cloth (two-directional weave), or unidirectional carbon fiber cloth (one directional weave). The graphene-resin mixture is then applied or brushed onto the carbon cloth, as shown in block 62. This process is repeated until the desired number of prepreg (fiber cloth and resin) layers has been formed over the mandrel. The number of prepreg layers used to construct the rod blank is dependent on the type of rod being made, the action, speed, and power of the rod, and other desired characteristics of the rod. Any of the prepreg layers may cover all of the rod blank or only selected portions thereof. For example, the 1K carbon layer may be applied to the proximal end of the rod up to the first line guide. Thereafter, a long continuous tape 42 such as a cellophane tape is tightly wrapped helically around the outermost layer of the rod blank, as shown in block 64. The tape 42 provides waterproof properties and can be made of cellophane and/or other suitable materials. In block 66, heat is applied for a predetermined duration to cure the resin. For example, the rod blank may be baked at approximately 130 degrees Celsius for approximately 150 minutes. The bake temperature and duration may be determined based on the type of epoxy resin used. The application of the tape is optional.

It may be seen in FIGS. 3 and 4 that the rod blanks may incorporate the fiber cloth and graphene-resin mixture alternately to form the rod blank. The inner-most layer of the rod blank may be the graphene-resin mixture 37 or the fiber cloth 41. The layers of fiber cloth can be woven or non-woven and made from materials including graphene fibers, carbon fibers, boron fibers, glass fibers, silicon carbide fibers, ceramic fibers, aramid (e.g., KEVLAR) fibers, and/or a combination of these materials. The fiber cloth may be arranged in a single ply or a plurality of plies. Because graphene possesses superior strength by weight and other qualities compared to other materials, graphene is hereby incorporated into the construction of a fishing rod that provides the desirable speed, action, power, and sensitivity one looks for in a high quality rod. The graphene preparation may be in powder, flake, or sheet form and may be referred to as graphene nano-powder commercially. Further as described above, graphene may also be incorporated into the fiber cloth.

After the hollow tapered tubular rod blank is cured, it is cut to the desired length and the handle and line guides are affixed or adhered to the rod blank. Preferably, the line guides are positioned along the spine of the rod blank, where the edges of the fiber cloth meet or slightly overlap along the length of the rod blank. The spine of the rod blank is slightly more stiff than the opposite side of the rod blank. Placing the line guides and reel seat with consideration to the location of the spine improves the performance of the fishing rod.

Placing the line guides along the spine or opposite the spine ensures that when the rod is under load, it does not twist when it bends.

The features of the present invention which are believed to be novel are set forth below with particularity in the appended claims. However, modifications, variations, and changes to the exemplary embodiments described above will be apparent to those skilled in the art, and the fishing rod and manufacturing method described herein thus encompasses such modifications, variations, and changes and are not limited to the specific embodiments described herein.

What is claimed is:

1. A fishing rod comprising:
   a hollow tubular rod blank having a plurality of prepreg layers, each prepreg layer formed by using a mandrel, the rod blank comprising:
      a graphene-resin mixture comprising a resin and a graphene preparation evenly disposed throughout the resin; and
      a fiber cloth impregnated with the graphene-resin mixture;
   wherein the plurality of prepreg layers are applied and pressed together in alternate layers of graphene-resin mixture and fiber cloth to form the rod blank; and
      an outer water-proofing layer formed by a long continuous tape helically and tightly wrapped around and bonded to the rod blank.

2. The fishing rod of claim 1, wherein the graphene-resin mixture comprises about ten percent graphene by weight.

3. The fishing rod of claim 1, wherein the graphene preparation comprises graphene nano-particles.

4. The fishing rod of claim 1, wherein the graphene preparation comprises graphene flakes.

5. The fishing rod of claim 1, wherein the resin comprises at least one of a polyester resin, a vinylester resin, and an epoxy resin.

6. The fishing rod of claim 1, wherein the fiber cloth comprises at least one of graphene fibers, carbon fibers, graphite fibers, boron fibers, glass fibers, silicon carbide fibers, ceramic fibers, and aramid fibers.

7. The fishing rod of claim 1, wherein the fiber cloth comprises woven fibers.

8. The fishing rod of claim 1, wherein the fiber cloth comprises non-woven fibers.

9. A method of forming a fishing rod, comprising:
   forming a plurality of prepreg layers over a mandrel, each prepreg layer comprising a graphene-resin mixture comprising a resin and a graphene preparation evenly disposed throughout the resin, and a fiber cloth impregnated with the graphene-resin mixture;
   pressing the plurality of prepreg layers together;
   forming the plurality of prepreg layers into a hollow tapered tube;
   tightly wrapping a long continuous tape helically around the hollow tapered tube; and
   applying heat to the plurality of prepreg layers to cure the resin and bond the long continuous tape to form a waterproof outer layer.

10. The method of claim 9, wherein forming a plurality of prepreg layers comprises:
    mixing a plurality of graphene flakes into a resin and forming the graphene-resin mixture, the graphene flakes comprising about ten percent by weight of the graphene-resin mixture;
    applying the graphene-resin mixture to the mandrel;
    applying the fiber cloth to the graphene-resin mixture on the mandrel; and
    repeating the graphene-resin mixture application and fiber cloth application until a desired number of prepreg layers are applied to the mandrel.

11. The method of claim 9, wherein forming a plurality of prepreg layers comprises:
    mixing a plurality of graphene flakes into a resin and forming the graphene-resin mixture, the graphene flakes comprising about ten percent by weight of the graphene-resin mixture;
    tightly rolling a fiber cloth to the mandrel;
    applying the graphene-resin mixture to the fiber cloth on the mandrel;
    repeating the fiber cloth application and the graphene-resin mixture application until a desired number of prepreg layers are applied to the mandrel; and
    repeating the graphene-resin mixture application and fiber cloth application until a desired number of prepreg layers is applied to the mandrel.

12. The method of claim 9, further comprising forming the graphene-resin mixture by thoroughly mixing graphene nano-particles into a resin.

13. The method of claim 9, further comprising forming the graphene-resin mixture by thoroughly mixing graphene flakes into a resin.

14. The method of claim 9, further comprising forming the graphene-resin mixture by thoroughly mixing the graphene preparation into a resin comprising at least one of a polyester resin, a vinylester resin, and an epoxy resin.

15. The method of claim 9, wherein forming a plurality of prepreg layers comprises using a fiber cloth comprising at least one of carbon fibers, graphite fibers, boron fibers, glass fibers, silicon carbide fibers, ceramic fibers, and aramid fibers.

16. A fishing rod comprising:
    a hollow tapered tubular rod blank formed over a mandrel from a plurality of prepreg layers, each prepreg layer comprising a resin with a graphene preparation about ten percent by weight evenly disposed throughout the resin, and a fiber cloth impregnated with the resin;
    wherein the plurality of prepreg layers are applied and pressed together in alternate layers of resin and fiber cloth to form the rod blank; and
    an outer water-proofing layer formed by a long continuous tape helically and tightly wrapped around and bonded to the rod blank.

17. The fishing rod of claim 16, wherein the resin comprises at least one of a polyester resin, a vinylester resin, and an epoxy resin.

18. The fishing rod of claim 16, wherein the fiber cloth comprises at least one of carbon fibers, graphite fibers, boron fibers, glass fibers, silicon carbide fibers, ceramic fibers, and aramid fibers.

19. The fishing rod of claim 16, wherein the fiber cloth comprises at least one of woven and non-woven fibers.

20. A method of forming a fishing rod, comprising:
    (a) adding graphene to a resin to form a graphene resin mixture;
    (b) allowing gases to escape the graphene resin mixture;
    (c) applying the graphene resin mixture to a mandrel;
    (d) rolling a fiber cloth over the graphene resin mixture and onto the mandrel to form a prepreg layer;
    (e) repeating steps (c) and (d) to add additional prepreg layers until desired thickness is achieved;
    (f) pressing the prepreg layers together;
    (g) forming the prepreg layers into a long hollow tapered tube;

(h) wrapping a long continuous tape helically and tightly around the long hollow tapered tube to form an outer layer; and
(i) applying heat to cure the resin.

21. A method of forming a fishing rod, comprising:
(a) adding graphene to a resin to form a graphene resin mixture;
(b) allowing gases to escape the graphene resin mixture;
(c) applying the graphene resin mixture to a fiber cloth;
(d) adding additional fiber cloth and graphene resin mixture layers;
(e) pressing the fiber cloth and graphene resin mixture layers together and forming a laminated prepreg sheet;
(f) rolling the laminated prepreg sheet onto a mandrel;
(g) forming the prepreg layers into a long hollow tapered tube;
(h) wrapping a long continuous tape helically and tightly around the long hollow tapered tube; and
(i) applying heat to cure the resin and form an outer waterproof layer.

22. A method of forming a fishing rod, comprising:
(a) adding graphene to a resin to form a graphene resin mixture;
(b) allowing gases to escape the graphene resin mixture;
(c) wrapping a fiber cloth onto a mandrel;
(d) applying the graphene resin mixture to the fiber cloth on the mandrel and forming a prepreg layer;
(e) repeating steps (c) and (d) to add additional prepreg layers until desired thickness is achieved;
(f) pressing the prepreg layers together;
(g) forming the prepreg layers into a long hollow tapered tube;
(h) wrapping a long continuous tape helically and tightly around the long hollow tapered tube to form an outer layer; and
(i) applying heat to cure the resin.

\* \* \* \* \*